(12) United States Patent
Wahl

(10) Patent No.: US 6,431,802 B1
(45) Date of Patent: Aug. 13, 2002

(54) ARTICULATED TOOL HEAD

(75) Inventor: Joachim Wahl, Monschau (DE)

(73) Assignee: DS Technologie Werkzeugmaschinenbau GmbH (DE)

( * ) Notice: Subject to any disclaimer, the term of this patent is extended or adjusted under 35 U.S.C. 154(b) by 0 days.

(21) Appl. No.: 09/581,008

(22) PCT Filed: Oct. 20, 1999

(86) PCT No.: PCT/EP99/07960

§ 371 (c)(1),
(2), (4) Date: Jun. 7, 2000

(87) PCT Pub. No.: WO00/25976

PCT Pub. Date: May 11, 2000

(30) Foreign Application Priority Data

Nov. 3, 1998 (DE) .......................................... 198 50 708

(51) Int. Cl.⁷ ................................................. B23C 1/12
(52) U.S. Cl. ....................... 409/201; 409/211; 409/216; 409/235
(58) Field of Search ................................. 409/135, 136, 409/144, 235, 213, 217, 185, 190, 191, 201, 211, 216; 901/23, 24, 41; 408/234, 236, 237

(56) References Cited

U.S. PATENT DOCUMENTS 4,709,455 A * 12/1987 D'Andrea ................... 409/201
5,378,091 A * 1/1995 Nakamura ................... 409/136
5,378,282 A * 1/1995 Pollard ......................... 901/23
5,941,128 A * 8/1999 Toyama et al. .............. 409/211
6,048,143 A * 4/2000 Chang et al. ................ 409/201
6,099,217 A * 8/2000 Wiegand et al. ............. 409/201
6,135,683 A * 10/2000 Kim et al. ................... 409/201
6,161,992 A * 12/2000 Holy et al. .................. 409/211
2002/0015624 A1 * 2/2002 Wang et al. ................. 409/201

FOREIGN PATENT DOCUMENTS

JP       A-86416      *  4/1991  ................. 409/211

OTHER PUBLICATIONS

"Werkzeugmaschinen" by Manfred Beck, Springer–Verlag 1998 pp. 203–209.

* cited by examiner

*Primary Examiner*—Daniel W. Howell
(74) *Attorney, Agent, or Firm*—Ostrolenk, Faber, Gerb & Soffen, LLP

(57) ABSTRACT

A universal-joint tool head, having a tool platform which can move in three axes, at least three connecting rods which are articulatedly mounted on the tool platform and can be displaced independently of one another, at least three linear-movement drives, which are arranged around and at a distance from the tool platform and are parallel to one another, for the connecting rods articulatedly mounted thereon, the connecting rods being articulatedly mounted on the tool platform in such a manner that they can move on all sides and on the linear-movement drives in such a manner that they can pivot about pins running perpendicular to the direction of movement of the linear-movement drives.

13 Claims, 2 Drawing Sheets

ARTICULATED TOOL HEAD

The invention relates to a universal-joint tool head as a unit which may form part of various milling-machine designs and is set up to move in the linear axes X, Y, Z.

BACKGROUND OF THE INVENTION

There are various types of milling machines with milling-head units with two continuously movable axles, for example milling-head units with an angle-pin head or with a fork head. DE 34 07 679 C1 has described a horizontal drilling and milling unit with a spindle head which can pivot about a pin which is inclined at 45° to the horizontal, can be locked in the horizontal and vertical working positions of the drilling spindle sleeve with a supporting housing and in which the spindle sleeve can be driven by means of a bevel gear mechanism.

Furthermore, U.S. Pat. No. 3,483,796 A has described a milling-head unit with a fork head, in which the fork head is allowed to pivot through up to 90° and to rotate about a pin which is perpendicular thereto. In these known milling-head units, the milling cutter spindle is driven through a spindle bar which can be adjusted in the X, Y and Z directions by means of intermediate gears which are responsible for the pivotability of the spindle head and the drive in each angular position. Servomotors effect the adjustment in the X, Y and Z directions. The supply of cooling lubricant and power to the spindle takes place via rotary leadthroughs, and the measurement-system signals are transmitted via slip rings. The housing components are generally made from steel. The spindle bar is mounted either hydrostatically or by means of rolling-contact bearings. These known milling-head units take up large amounts of space, have a high mass and problems with sealing the supply of cooling lubricant to the spindle. The known systems are difficult to assemble, the manufacturing costs are high and the maintenance outlay is considerable.

The reference book "Werkzeugmaschinen" [Machine tools] by Manfred Beck, Springer-Verlag 1998, pages 203 to 209, describes more recent machine tool designs based on the HEXAPOD principle, operating on the basis of a bar mechanism. One of the machines described has six stilts, the length of which cannot be changed and of which in each case two can be displaced vertically on a frame which has three stands. The tool unit is manipulated through displacement of the points where the bars are articulatedly attached to the frame. The rigid bars are mounted by means of ball and cardan joints in the drive carriages which are vertically displaceable on the frame and in which the primary parts of linear drives are integrated. In each case two primary parts which can be displaced independently of one another make use of a common secondary part. The points where the bars are articulatedly mounted on the tool unit are designed in such a way that in each case three bars engage on the front area and three on the rear area of the tool unit. Owing to the arrangement of the tool unit on three pairs of bars, control requires six degrees of freedom, even though only five degrees of freedom are required to machine workpieces on all sides by means of a milling head. For this reason, control outlay is unnecessarily high. Furthermore, the arrangement of the tool unit on bars which can be displaced by means of carriages on vertical stands limits the possible working space. However, compared to conventional milling-machine designs, the HEXAPOD principle has the advantage of a compact design for the tool unit with a low mass, so that rapid accelerations are possible. Furthermore, the HEXAPOD design provides a high level of system strength.

The invention is based on the problem of avoiding the drawbacks of the known milling-machine designs with milling-head units, making use of the advantages of the HEXAPOD principle and improving this principle in such a way that, by dint of the reduced requirements in terms of components and space, the omission of additional gear components and rotary leadthroughs and the reduction in the number of components, it is possible to reduce the construction and maintenance outlay and the moving masses, so that higher accelerations of the driven shafts and a lower outlay on control engineering can be achieved.

SUMMARY OF THE INVENTION

Working on the basis of this problem, it is proposed to equip the universal-joint tool head with a tool platform which can move in three axes, two pivoting axes and one linear axis, at least three connecting rods which are articulatedly mounted on the tool platform and can be displaced independently of and parallel to one another, at least three linear-movement drives, which are arranged at a distance from and around the tool platform and are parallel to one another, for the connecting rods which are articulatedly mounted thereon, the connecting rods being articulatedly mounted on the tool platform in such a manner that they can move on all sides and being articulatedly mounted on the linear-movement drives in such a manner that they can pivot about pins running perpendicular to the direction of movement.

Since the tool platform is mounted on connecting rods which can be displaced independently of and parallel to one another, it is possible to provide direct drives both for a motor spindle and for the pivot axes and the linear axis, and the lines for supplying cooling lubricant and power can be connected directly to the tool platform or to a motor spindle or to a milling-cutter spindle support or to a milling-cutter spindle drive without using rotary leadthroughs.

Advantageously, a motor spindle with a mount for an angle head which can be exchanged automatically from a tool magazine and can rotate in a controlled manner about the axis of the motor spindle may be arranged on the tool platform. Angle heads of this nature can be used to drill holes in different angular positions.

Preferably, the linear-movement drives may be attached to the inner surface of a tubular housing in such a way that they are parallel to one another and to the axis of the housing; the connecting rods may be designed as A-frame arms and their tips may be articulatedly mounted on the tool platform in such a manner that they can move on all sides, while their bases may be articulatedly mounted on the linear-movement drives in such a manner that they can pivot about pins running perpendicular to the direction of movement of the linear-movement drives.

If the tubular housing is arranged in a spindle bar or is designed as a spindle bar and can be displaced in the axial direction, and the spindle bar is arranged on a vertically adjustable carriage 26 which is guided on a stand 25, the stand and the workpiece 27 being displaced relative to one another, very large workpieces can be machined in the same way as with a conventional milling machine, but more quickly and with greater accuracy.

In detail, the connecting rods may be designed so as to initially run substantially obliquely in the radial direction and then, having been bent off through an angle, to run approximately parallel to the linear-movement drives, so that their pivot pins on the linear-movement drives are offset with respect to the articulation points on the tool platform.

Play-free guidance and movement control of the connecting rods is achieved if the linear-movement drives have linear direct drives or recirculating ball screw drives which are moved by servomotors.

A CNC control unit for the linear-movement drives effects the tilting of the motor milling-cutter spindle about the two pivot axes and the movement in the direction of the third linear axis, and position indicators for the connecting rods, which interact with the CNC control unit, may be integrated in the linear-movement drives.

The measurement systems which are required for the machine control unit to measure the rotation angles about the pivot axes and the displacement travel in the direction of the linear axis, can be integrated in the linear-movement drives, either as a result of suitable encoders being integrated in the corresponding drives or the drives themselves being designed as distance or rotation-angle indicators.

As a result of the tool platform being suspended from the connecting rods, the lines for the supply of cooling lubricant and power can be directly connected to the tool platform without using rotary leadthroughs and can be coupled to automatically changeable motor spindles or machining heads.

The novel design of the universal-joint tool head with the tool platform mounted on connecting rods which can be displaced independently and in parallel in the linear axis results in a reduced need for space in this direction, since there is no need for any additional gear components between the universal-joint tool head and the spindle bar. As a result, it is also possible to reduce the number of components, and the fact that rotary leadthroughs are no longer required means that a higher level of reliability and an improved seal is achieved for the supply of cooling lubricant and power. If, in addition, the housings and/or housing parts consist of a light metal alloy, of a titanium alloy and/or of foamed metal, the moving masses can be reduced still further, so that both higher accelerations in the X, Y and Z directions and higher accelerations about the pivot axes are possible, since the use of low-mass servomotors eliminates the limitations which are present in the known milling-head units.

BRIEF DESCRIPTION OF THE DRAWINGS

The invention is explained in more detail below with reference to an exemplary embodiment illustrated in the drawings, in which.

DETAILED DESCRIPTION OF THE PREFERRED EMBODIMENTS

Figure 1:
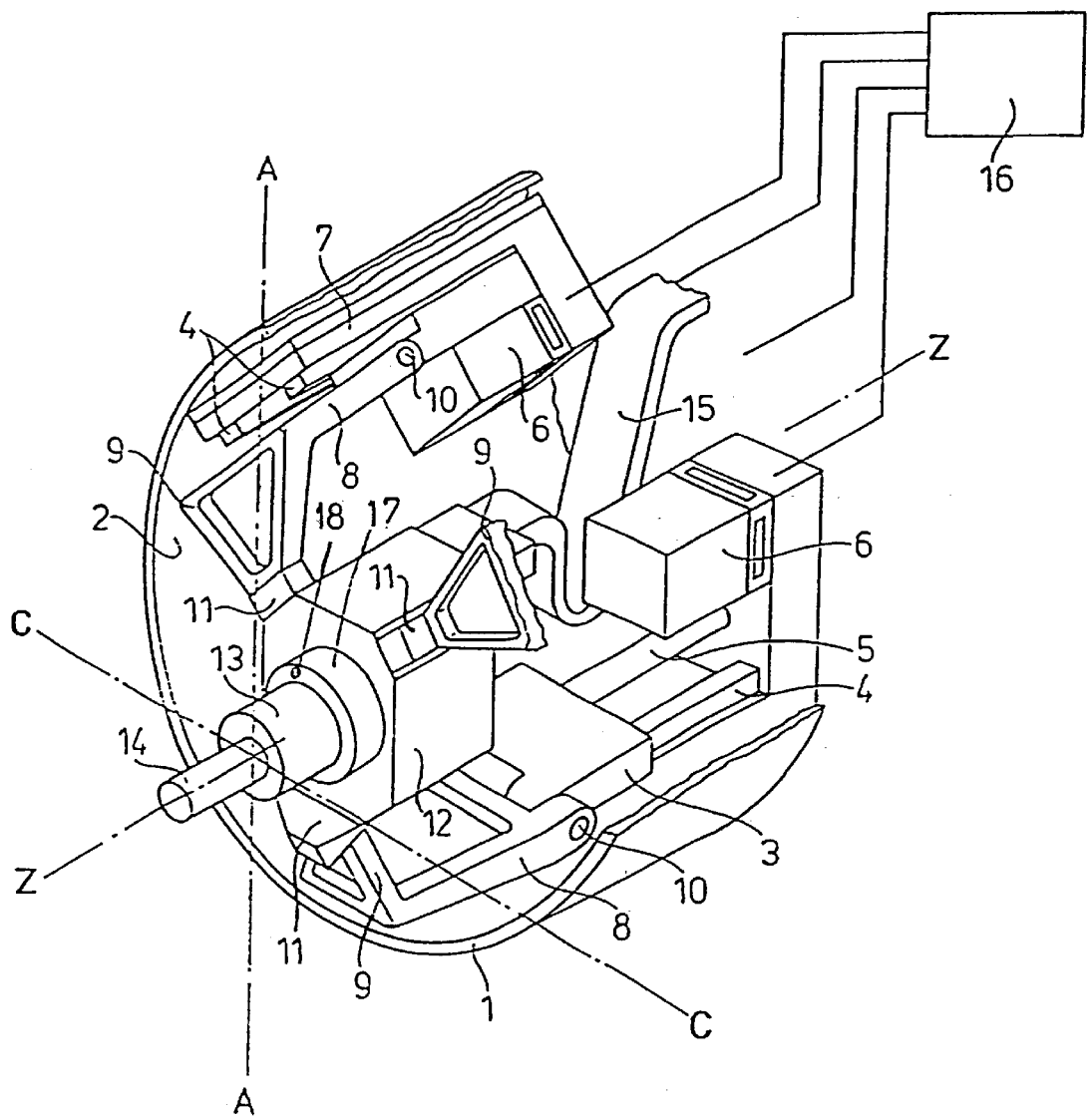
FIG. 1 shows a perspective, partially cut-away view of a universal-joint tool head.
Figure 2:
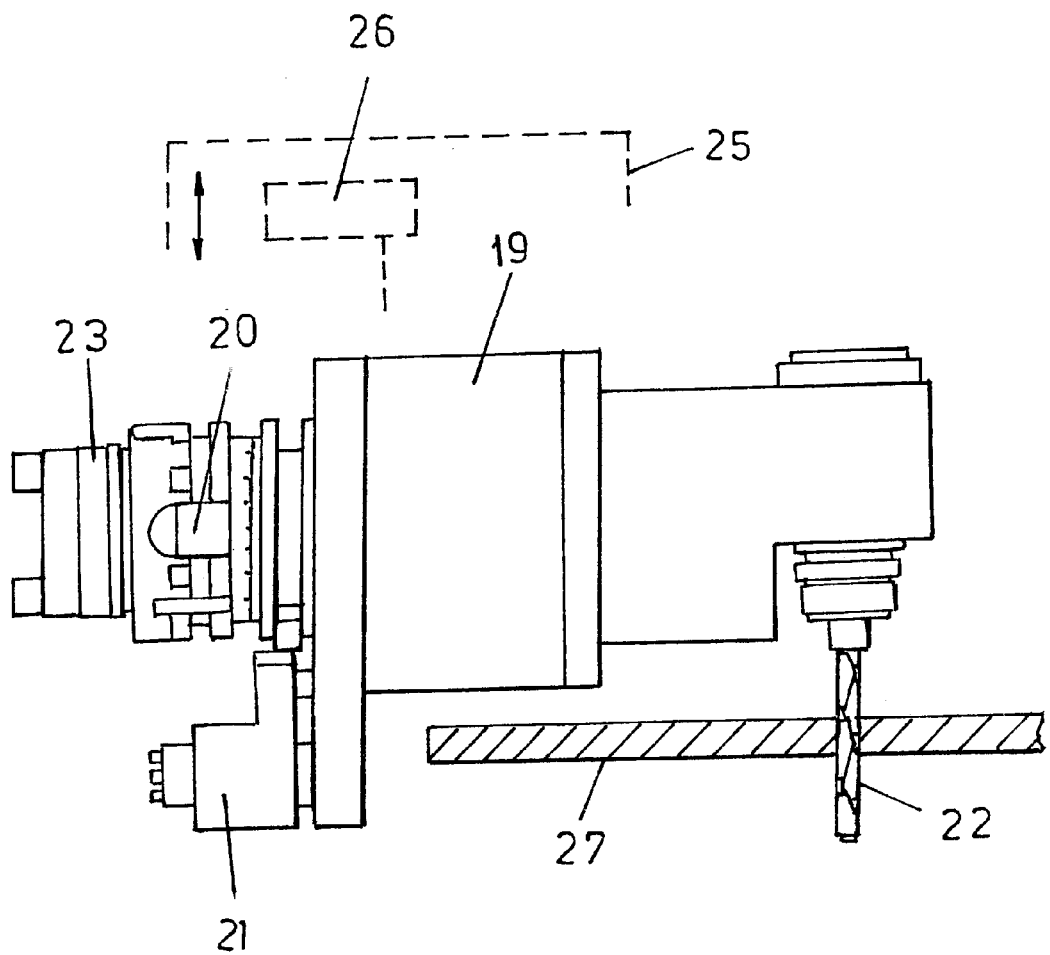
FIG. 2 shows a side view of an angle head which can be fitted to a motor spindle.

Of a machine tool, only the universal-joint tool head according to the invention is illustrated in a perspective view. A tubular housing 1, which may be arranged in a horizontal or vertical spindle bar or may be designed as a spindle bar and may be movable in the X, Y and Z directions, bears three linear-movement units on its inner surface 2, spaced apart from one another at regular intervals over the circumference, which units comprise carriages 3 which can be moved without play on guides 4, which are attached to baseplates 7, by means of a recirculating ball screw drive 5 and, for this purposes, are driven by servomotors 6.

Linear direct drives can also be used instead of the recirculating ball screw drives 5 and the servomotors 6.

Connecting rods which can pivot with one degree of freedom about pivot pins 10 and comprise a connecting-arm part 8 running substantially in the Z direction and a connecting-rod part 9 running substantially radially with respect thereto are mounted pivotally on the carriages 3. The connecting rods 8, 9 are designed as A-frame arms, the pivot pin 10 running through their bases perpendicular to the direction of movement of the carriages 3 and therefore to the Z axis, while in the region of their tips universal joints 11 which can move on all sides and have three degrees of freedom, for example ball joints, are provided, connected to a tool platform 12. A motor spindle 13 can be fitted automatically into the tool platform 12. The motor spindle 13 bears a milling tool 14 and is connected, via automatic couplings and plug connectors and via a line 15, to a CNC control unit 16, which also controls the servomotors 6.

The servomotors 6 may have integrated measurement systems, for example independent rotation transducers, or may themselves be designed as rotary transducers, so that signals which are representative of the current position of the carriages 3 are passed to the CNC control unit.

By way of example, if only the bottom carriage 3 is displaced, the motor milling-cutter spindle 13 pivots about the axis C, which runs parallel to the pivot pin 10. As a result of the top carriages 3 being displaced in the opposite direction, the motor milling-cutter spindle 13 pivots about the axis A which is perpendicular to the axis C, while a simultaneous displacement of all three carriages in the same direction results in a displacement of the motor milling-cutter spindle 13 in the direction Z. In a similar way, three-dimensional movements of the motor milling-cutter spindle 13 in any desired direction can be brought about by suitably controlling the servomotors 6 by means of the CNC control unit 16.

The line 15 is used both to supply power to the motor milling-cutter spindle and to supply cooling lubricant, and is directly connected to the housing 12 of the motor milling-cutter spindle 13 without the use of rotary leadthroughs.

A mount 17 for an angle head 19 which can be changed automatically from a tool magazine and can rotate in a controlled manner about the axis of the motor spindle 13 is arranged on the tool platform 12, so that the angle head 19 can pivot about the Z axis under NC control. The angle head 19 serves to hold drills 22 for drilling holes at different angles. The angle heads 19 are standard angle heads which are supplied by various manufacturers and therefore do not need to be described in detail. The rotation about the Z axis is effected by means of a rotary drive 21, the torque support for which is provided by a journal 20 engaging in a hole 18 in the mount 17. The angle head 19 is coupled to the motor spindle 13 via a standard tool cone 23 in a standard tool mount of the motor spindle 13.

If the tubular housing is arranged in a spindle bar or is designed as a spindle bar and can be displaced in the axial direction, and the spindle bar is arranged on a vertically adjustable carriage 26 which is guided on a stand 25, the stand and the workpiece 27 being displaced relative to one another, very large workpieces can be machined in the same way as with a conventional milling machine, but more quickly and with greater accuracy.

What is claimed is:

1. A universal-joint tool head, comprising:
   a tool platform for supporting a tool which extends in a direction out of the platform, the platform being adapted for movement about three mutually perpendicular axes, two of the axes being axes of rotation of the platform across the direction of extension of the tool, and the third axis being an axis of translation of the platform;

three rails placed at fixed circumferential intervals relative to one another and around the tool platform, each of the three rails extending parallel to each other and to the axis of translation and being axially at the same location along the axis of translation;

three carriages, each of the carriages being supported on and to travel along a respective one of the three rails with motion independent of the other carriages; and three connecting rods, each rod having a first end and a second end, each of the first ends being pivotally connected to a respective one of the carriages at a pivot axis tangent to a radius perpendicular to the axis of translation, and each of the second ends being connected to the platform so as to enable movement of the connecting rods with respect to the platform in all directions.

2. A universal-joint tool head, comprising:

a tool platform adapted for movement about three mutually perpendicular axes, two of the axes being axes of rotation, and one axis being an axis of translation;

three rails placed at circumferential intervals around the platform, the rails extending parallel to each other and to the axis of translation;

three carriages, each of the carriages being supported on and to travel along a respective one of the three rails with motion independent of the other carriages; and three connecting rods, each rod having a first end and a second end, each of the first ends being pivotally connected to a respective one of the carriages at a pivot axis tangent to a radius perpendicular to the axis of translation, and each of the second ends being connected to the platform so as to enable movement of the connecting rods with respect to the tool platform in all directions, each connecting rod being an A-frame arm.

3. The universal-joint tool head as claimed in claim 2, wherein each connecting rod includes:

a first portion extending substantially parallel to the axis of translation from the first end of the connecting rod; and a second portion which extends substantially radially from the first portion to the second end of the connecting rod.

4. The universal-joint tool head as claimed in claim 1, wherein each carriage includes a linear direct drive or a recirculating ball screw drive which is actuated by a servomotor so as to move each of the carriages along its respective rail.

5. The universal-joint tool head as claimed in claim 1, further including an NC control unit connected to the carriages for enabling the traveling of the carriages along their respective rails.

6. The universal-joint head as claimed in claim 1, further including a position indicator for each connecting rod, each position indicator being integrated into a respective one of the carriages.

7. The universal-joint tool head as claimed in claim 1, further including:

a motor spindle having a milling tool for milling a workpiece, the motor spindle being arranged on the tool platform such that the motor spindle is moved about the three axes as the tool platform is moved about the three axes, the motor spindle further having an angle head mount; and an angle head connected to the mount, the angle head holding a plurality of milling tools for milling the workpiece at different angles, the milling tools being exchangeable with the milling tool of the motor spindle.

8. The universal-joint tool head as claimed in claims, further comprising a tubular housing having an inner surface to which the three rails are fixed at corresponding locations spaced angularly from one another at the fixed circumferential intervals, the tubular housing being arranged in a horizontal or vertical spindle bar or designed as a spindle bar and being movable in the X-, Y- and Z-directions.

9. The universal-joint tool head as claimed in claim 7, further including supply lines for cooling lubricant and power, wherein the supply lines are directly connected to the tool platform without the use of rotary leadthroughs and are adapted to be coupled to the motor spindle.

10. A universal-joint tool head, comprising:

a tubular housing having an inner surface;

a stand arranged to support the tubular housing above a workpiece;

a vertically adjustable carriage guided on the stand so as to vary the vertical distance between the tubular housing and the workpiece;

a tool platform mounted in the housing and displaceable therewith, the tool platform being displaceable in the housing about three mutually perpendicular axes, two of the axes being axes of rotation, and one axis being an axis of translation;

three rails placed at circumferential intervals around the platform, the three rails extending parallel to each other and to the axis of translation;

three carriages, each of the carriages being adapted to travel along a respective one of the three rails;

three connecting rods each having a first end and a second end, each of the first ends being pivotally connected to a respective one of the carriages at an axis tangent to a radius perpendicular to the axis of translation, and each of the second ends being connected to the platform so as to enable movement of the connecting rods with respect to the platform in all direction; and a motor spindle having a milling tool for milling the workpiece, the motor spindle being arranged on the tool platform.

11. A universal-joint tool head, comprising:

a tubular housing arranged in a horizontal or vertical spindle bar or designed as a spindle bar, the tubular housing having an inner surface and the housing being movable in the X-, Y- and Z-directions;

a tool platform adapted for movement about three mutually perpendicular axes, two of the axes being axes of rotation, and the third axis being an axis of translation;

three rails placed at fixed circumferential intervals around the tool platform and mounted to the inner surface of the housing so that the housing and the three rails are coupled to each other in a non-rotational manner, the rails being axially at the same location along the axis of translation and being parallel to each other and to the axis of translation;

three carriages, each of the carriages being displaceable independently along a respective one of the three rails parallel to the axis of translation; and three connecting rods, each of the connecting rods having a first end and a second end, each of the first ends being pivotally connected to a respective one of the carriages at a pivot axis perpendicular to a radius perpendicular to the axis of translation, each of the second ends being connected to the platform so as to enable movement of the connecting rods with respect to the tool platform in all directions.

12. A universal-joint tool head, comprising:

a tubular housing having an inner surface centered on a longitudinal housing axis;

a tool platform mounted in the housing and spaced radially inwardly from the inner surface;

three elongated rails fixed to the inner surface of the housing so that the three rails are spaced angularly equidistantly from one another;

three carriages, each of the carriages being displaceable along a respective one of the three rails parallel to the housing axis;

three connecting rods, each of the connecting rods having a first end pivotally connected to a respective carriage at a pivot axis which extends tangent to a radius perpendicular to the housing axis, and a second end connected to the tool platform; and an actuating mechanism for selectively actuating the three carriages so that when each of the carriages is movable along a respective rail parallel to the housing axis, the tool platform is displaceable radially either away or toward the housing axis as the one end of a respective connecting rod pivots about the pivot axis, and when all three carriages are moved, the tool platform is displaceable parallel to the housing axis.

13. The universal-joint tool head defied in claim 12, wherein the actuating mechanism includes three independent actuators, each of the three independent actuators being connected to a respective one of the three carriages.

\* \* \* \* \*